United States Patent [19]

Metzger et al.

[11] 4,051,515
[45] Sept. 27, 1977

[54] COLOR VIDEO SIGNAL RECORDING AND REPRODUCING APPARATUS PROVIDING PREFERENTIAL DROPOUT COMPENSATION AND TIME BASE ERROR CORRECTION

[75] Inventors: Lenard M. Metzger; William Kelsey Hickok, both of Rochester, N.Y.

[73] Assignee: Eastman Kodak Company, Rochester, N.Y.

[21] Appl. No.: 677,101

[22] Filed: Apr. 15, 1976

[51] Int. Cl.² .............................................. H04N 5/76
[52] U.S. Cl. .......................................... 358/8; 360/38
[58] Field of Search ................... 358/4, 8, 9; 360/19, 360/22, 24, 33, 38

[56] References Cited

U.S. PATENT DOCUMENTS 3,399,272  8/1968  Krause .................................. 360/19

Primary Examiner—Robert L. Richardson
Attorney, Agent, or Firm—Robert F. Cody

[57] ABSTRACT

The present invention departs from conventional concepts, involving the use of magnetic tape or the like, of color video signal recording by providing video signal recording and reproducing apparatus in which preferential dropout compensation is obtained without the use of special dropout compensation circuitry. A color video signal is down-converted in frequency to produce a video signal of a recordable frequency range with picture information at relatively low frequencies and color and sound information at relatively higher frequencies, respectively. Dropouts, therefore, affect the sound information first, the color information second, and the picture information last, as is preferable. In accordance with another aspect of the invention, time base error correction is obtained without the use of time base error correction circuitry by separating the luminance and chrominance signals and so down-converting each signal to a recordable frequency range that the luminance carrier and the chrominance carrier have the same frequency. Upon recording and playing back, time base variations, as may be caused by tape flutter, will then affect both carriers equally. After up-converting and recombining the luminance and chrominance signals to form the original video signal, the frequency spacing between the luminance carrier and the chrominance carrier will be independent of time base variations in the recording process and, therefore, have the same frequency spacing as the original video signal.

5 Claims, 9 Drawing Figures

RF SPECTRUM

IF SPECTRUM

RECORD/PLAYBACK SPECTRUM

COLOR VIDEO SIGNAL RECORDING AND REPRODUCING APPARATUS PROVIDING PREFERENTIAL DROPOUT COMPENSATION AND TIME BASE ERROR CORRECTION

BACKGROUND OF THE INVENTION

1. Field of the Invention

The present invention relates to a color video signal recording and reproducing system in which a color video signal is down-converted in frequency to a more recordable frequency range and then recorded on a record medium. In one form of the invention, the bandwidth of the video signal is split and each portion down-converted to a recordable frequency range for recording in separate tracks of the record medium.

2. Description Relative to the Prior Art

In general, color video signal recording and reproducing systems employing magnetic tape process a color video signal in a relatively complex manner for recording and then reverse the processing upon playback to form the original video signal. As is known, magnetic recording may be subject to the dropout of signal information, and such dropouts, which are usually caused by the playhead losing intimate contact with the tape, are frequency dependent. That is, it is easier to lose high frequency signal information than low frequency signal information during playback. To compensate for dropouts, and tape-flutter induced time base variations, special correction circuitry is generally included.

U.S. Pat. No. 2,921,976 relates to reproducing color television chrominance signals. In accordance with the patent, the chrominance signal is heterodyned with a constant frequency signal to produce a converted chrominance signal having a recordable frequency range. The heterodyning frequency can be "in the neighborhood of 3 mc or 4 mc; the exact frequency in this case is not particularly important". Upon playback, the frequency of the heterodyning signal employed to convert the recorded chrominance signal up to its original frequency range varies in response to the output of a discriminator. The discriminator compares the frequency of the color burst signal, as derived from the played-back video signal, with a fixed reference signal having a frequency of 3.58 MHz and produces an output signal indicative of the difference in frequency. This output signal is used to adjust the frequency of the heterodyning signal in such a manner as to compensate for time base variations. Systems in which information from the color burst signal is employed to achieve time base error correction are generally known as "burst" systems.

U.S. Pat. No. 3,723,638 discloses a color video signal recording and reproducing system in which the luminance and chrominance signals of a color video signal are separated. The luminance signal is used to frequency modulate a recordable carrier signal. The chrominance signal is frequency converted to a recordable frequency range. The frequency modulated luminance signal and frequency converted chrominance signal are superimposed and recorded. Upon playback, the luminance and chrominance signals are separated, the luminance signal demodulated, and the chrominance signal frequency converted to produce the originally recorded signal. The color burst signal from the played back chrominance signal is employed to compensate for time base errors introduced during the recording process.

U.S. Pat. No. 3,580,990 discloses a recording and reproducing system for color video signals which processes and records the luminance and chrominance signals similarly to the system disclosed in U.S. Pat. No. 3,723,638. Instead of using the color burst signal to correct for time base variations, however, a pilot signal is recorded along with the video information. Upon playback, phase variations in the pilot signal are employed to control time base errors in the reproduced chrominance signals. Time base error correction systems of this type are called "pilot" systems. Amplitude variations in the pilot signal are used to control the amplification given to the chrominance signal upon playback, thereby compensating the chrominance signal for tape-to-head dropouts.

SUMMARY OF THE INVENTION

In accordance with one aspect of the present invention, the processing of a color video signal before recording is kept to a minimum, and the video signal is so processed that preferential dropout compensation is provided inherently, without the use of any special dropout compensation circuitry. The video signal is down-converted in frequency so that the video signal occupies a recordable frequency range and, further, the video signal is so down-converted that the luminance information is at relatively low frequencies and the chrominance and sound information is at relatively higher frequencies, respectively. Dropouts therefore affect the sound information first, the color information second, and the picture information last, as is preferred.

In accordance with a further aspect of the invention, not only are the effects of dropouts reduced, but, in addition, time base errors, resulting, say, from tape speed variations, are accurately corrected without the use of a special correction system such as a pilot system or burst system: The luminance and chrominance signals are separated and each signal is down-converted to a recordable frequency range enabling the chrominance signal spectrum to be recorded at frequencies comparable to, or even lower than, the luminance signal spectrum. (Thus, the recorded chrominance signal is less sensitive to dropouts.) By down-converting the luminance and chrominance signals so that their respective carriers have the same frequency, playback time base variations, if any, will effect both carriers equally; therefore, upon up-conversion and recombination to form the original video signal, the frequency spacing between the luminance carrier and the chrominance carrier will necessarily be the same as in the case of the original video signal.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Figure 1:
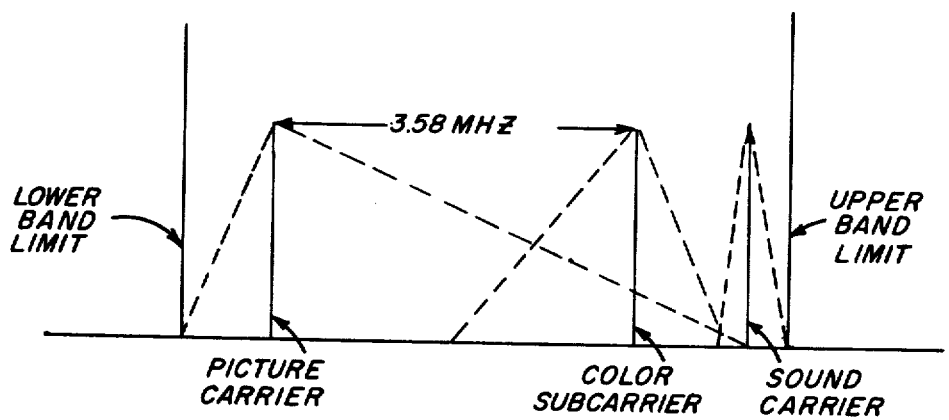
FIG. 1 shows the format of a video signal of a standard color transmission.

The video signal spectrum of a standard color television transmission contains a picture carrier, a color subcarrier, and a sound carrier positioned with a 6 MHz band of the electromagnetic spectrum as shown in FIG. 1. Color video recording and reproducing systems are concerned with extracting signal information from the video signal spectrum, recording this signal information on a record medium, and, upon playback, reconstituting the video signal spectrum in a form compatible with a conventional color television receiver. For example, it is known in the art to demodulate the picture carrier and color subcarrier to obtain amplitude varying signals indicative of the luminance and chrominance information, respectively. Commonly, there are three amplitude varying signals, one signal containing luminance information and two signals containing chrominance information. Each of these three signals may be recorded on a separate track. Upon playback, each of the amplitude varying signals modulates an appropriate carrier wave in such a manner as to regenerate the original video signal. This type of video recording and reproducing system is one that falls within that class of systems commonly called "direct" recording systems.

A step removed from such a direct recording system is an FM recording system. In an FM recording system, the picture carrier and color subcarrier may be demodulated as in the direct recording system, but the amplitude varying signals thus obtained are not directly recorded on a record medium. Instead, the amplitude varying signals are used to frequency modulate carrier waves of recordable frequencies, and it is these frequency modulated carrier waves which are recorded.

Video recording systems are also known which combine principles of direct recording with FM recording. These "hybrid" systems demodulate the picture carrier to obtain an amplitude varying signal representing the luminance information. This amplitude varying signal then modulates a carrier wave of recordable frequency. The chrominance signal, on the other hand, is down-converted to a rcordable frequency range and recorded directly. Thus, the luminance information is recorded in the form of a frequency modulated wave and the chrominance signal is recorded directly.

The present invention proposes a departure from the prior art. In accordance with the present invention, a video recording and reproducing system is provided which does not require demodulating the picture carrier and color subcarrier only to modulate other appropriate carrier waves, as is done in FM recording systems. Nor does a video recording system as taught by the present invention require demodulation of the picture carrier and the color subcarrier to obtain the amplitude varying signals recorded in direct recording systems. Further, upon playback, the recorded signals need not be demodulated (as in FM recording sytems) to produce the signal spectrum of FIG. 1, or used to modulate appropriate carrier waves (as in both direct and FM recording systems).

Figure 3:
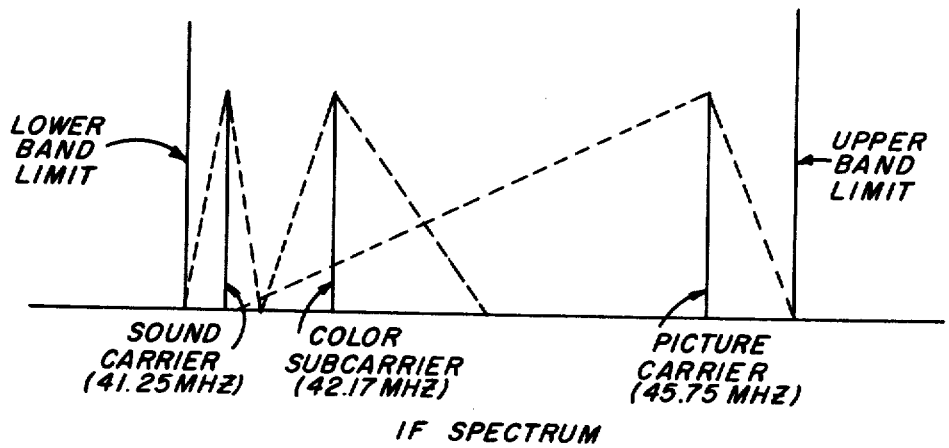
FIG. 3 shows the format of an intermediate frequency video signal.
Figure 4:
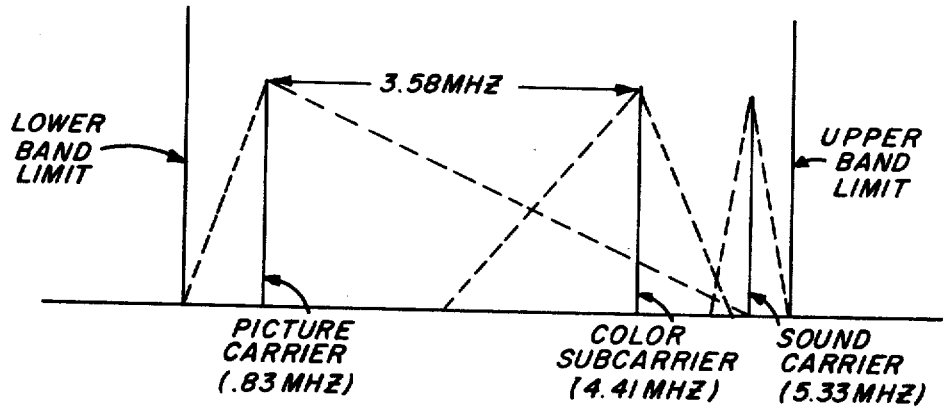
FIG. 4 shows the format of a video signal as recorded by the recording and reproducing apparatus of FIG. 2.
Figure 2:
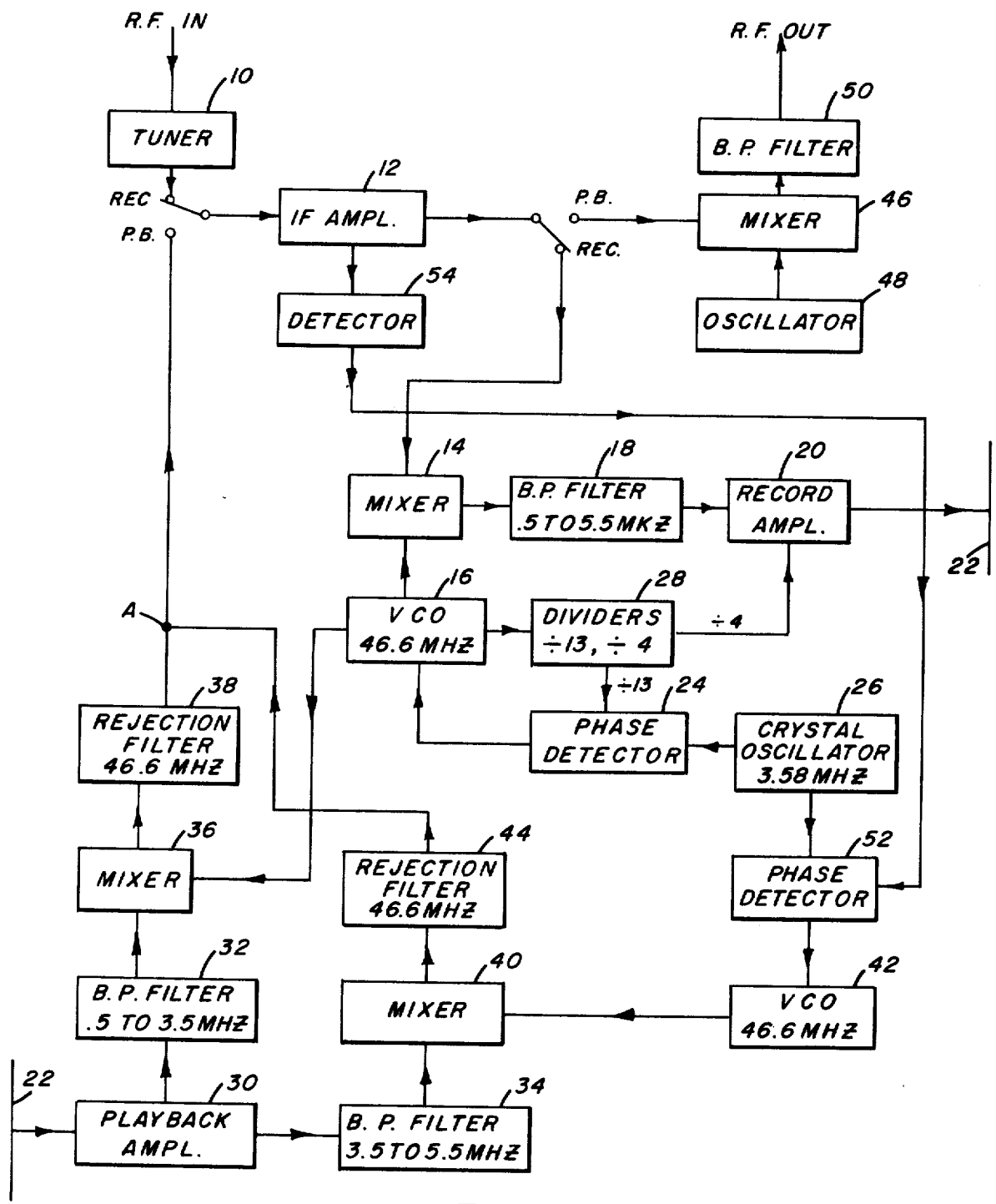
FIG. 2 shows, in block schematic form, video recording and reproducing apparatus in accordance with one embodiment of the present invention.

An embodiment of the present invention is shown in FIG. 2. Radio frequency video signal spectra, corresponding to the various television channels, and each being similar to the spectra, as shown in FIG. 1, are applied to a tuner 10. The tuner 10 selects a desired television channel, the corresponding video signal of which is mixed with a radio frequency signal from a local oscillator (not shown) to produce an intermediate frequency (IF) video signal spectrum, as shown in FIG. 3. Due to the mixing step, the positions within the spectrum of the picture carrier, color subcarrier, and sound carrier have been "reflected". This IF video signal spectrum is fed to an IF amplifier 12 and then to a mixer 14. In the mixer 14, the IF video signal spectrum is heterodyned with a signal — 46.6 MHz — produced by a voltage controlled oscillator (VCO) 16. The resulting video signal spectrum after mixing is shown in FIG. 4. It will be noted that this signal spectrum is similar to the video signal spectrum of FIG. 1, except that the frequency band has been down-converted to produce a signal spectrum having the picture carrier at 0.83 MHz, a color subcarrier at 4.41 MHz, and a sound carrier at 5.33 MHz. This signal spectrum, after being passed through a bandpass filter 18 wherein unwanted frequencies are rejected, is then applied to a record amplifier 20 for recording on a magnetic record medium 22.

As previously stated, the IF video signal from the IF amplifier 12 is heterodyned with a 46.6 MHz heterodyning signal from the VCO 16 in the mixer 14. Any frequency variations in the 46.6 MHz heterodyning signal will produce time base variations in the recorded video signal. It is very desirable, therefore, that some method be provided for maintaining the 46.6 MHz heterodyning signal within very close tolerances. To this end, a phase detector 24 is provided which compares a reference signal having a frequency of 3.58 MHz (more precisely, 3.579545 MHz) generated by a crystal oscillator 26, with the 46.6 MHz heterodyning signal after the heterodyning signal has passed through a frequency divider 28. The 46.6 MHz signal was chosen to be 13 × 3.58 MHz = 46.6 (more precisely, 13 × 3.579545 MHz = 46.534085). Therefore, the 46.6 MHz signal, when passed through a divided-by-13 circuit, included in the divider 28, is precisely 3.58 MHz (3.579545 MHz) and can be compared by the phase detector 24 with the 3.58 MHz signal from the crystal oscillator 26. The dividers 28 also include a divide-by-4 circuit which provides an output signal having a frequency of 10.3 MHz which is fed to the record amplifier 20 to serve as an AC bias signal for recording on magnetic tape.

Figure 4A:
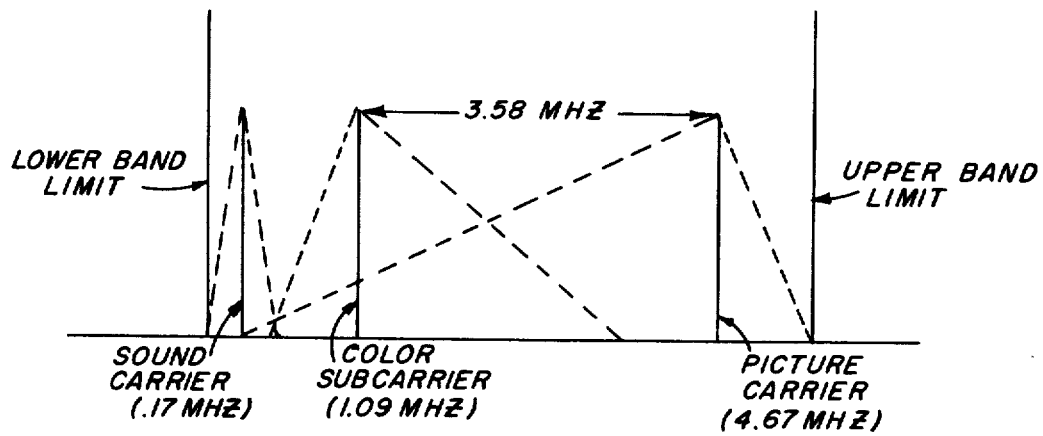
FIG. 4a shows the format of a video signal which is the mirror image of the video signal format shown in FIG. 4.

Since the RF video signal has been mixed once in the tuner 10 to produce an IF video signal, and then mixed again in the mixer 14 to produce the record/playback video signal, it may appear that an unnecessary mixing stage has been employed. For example, why not down-convert the RF video signal to the record/playback video signal in one mixing operation, thereby eliminating the need for one mixer and its associated circuitry? The justification for providing an apparently unnecessary mixing step lies in the realization that if the RF video signal were down-converted to the record/playback signal in one mixing step, the relative positions of the picture, color, and sound carriers would be as shown in FIG. 4a. An advantage of providing the "extra" mixer step is a video recording sytem which inherently gives desirable preferential dropout compensation. It is realized that dropout compensation is not conventionally obtained through the addition of a mixer, but is normally obtained by the use of specially designed dropout compensation circuitry. It is, therefore, appropriate to consider the method of dropout compensation provided by the present invention in more detail.

A dropout, caused by the recording head and magnetic tape losing intimate contact, affects the highest frequencies most severely. If the video signal were recorded having the relative carrier wave positions as shown in FIG. 4a, dropouts would most severely affect the high power picture information near the picture carrier, and somewhat less severely affect the color information, and then the sound information. Providing the "extra" mixer step, however, produces a video signal for recording having the relative carrier wave positions shown in FIG. 4. In this case, dropouts first affect the sound, then the color, and lastly the picture information. Viewing a television receiver is subjective in nature. It has been determined that dropouts of the picture information are generally more obnoxious than dropouts of the sound or color information. The preferential, and inherent, dropout compensation, resulting from two-step mixing practices of the invention, and achieved by recording a video signal having relative carrier wave positions as shown in FIG. 4, is, therefore, preferable to the recording technique implicit in FIG. 4a. Obviously, there is nothing esoteric about the use of two, as opposed to four, or six, etc, mixing steps. What is important, though, is that this signal as recorded be of a form as depicted in FIG. 4.

The playback portion of the video recording and reproducing system (FIG. 2) has special circuitry to compensate for time base errors introduced by the recorder. Upon playback, the video signal (shown in FIG. 4) is fed to a playback amplifier 30 and then to a pair of bandpass filters 32 and 34. The bandpass filter 32 passes frequencies between 0.5 MHz and 3.5 MHz, and the bandpass filter 34 passes frequencies between 3.5 MHz and 5.5 MHz. The net effect is that luminance signals are passed by the bandpass filter 32, and the chrominance and sound signals are passed by bandpass filter 34.

Considering first the luminance signals, a mixer 36 is provided wherein the luminance signals are heterodyned with a 46.6 MHz signal generated by the VCO 16. The luminance signals are thus up-converted in frequency to form an IF luminance signal spectrum which is then passed through a rejection filter 38. The purpose of the rejection filter 38 is to reject the 46.6 MHz heterodyning signal.

The chrominance and sound signals are treated differently than the luminance signals. After passing through the bandpass filter 34, the chrominance and sound signals are fed to a mixer 40 wherein they are combined with a 46.6 MHz heterodyning signal generated by a VCO 42. The up-converted chrominance and sound signals pass through a rejection filter 44 and are then recombined with the luminance signals at a point A. The reconstructed video signal spectrum at the point A is shown in FIG. 3. This video signal spectrum (IF) is fed to the IF amplifier 12 and then to an RF mixer 46 wherein it is heterodyned with a signal generated by an oscillator 48 to form the RF video signal spectrum shown in FIG. 1. A bandpass filter 50 passes the desired video signal spectrum and rejects any unwanted signals which may be present. The RF video signal spectrum from the bandpass filter 50 has the form of the originally recorded RF video signal spectrum and can be fed directly to the antenna terminals of a color television receiver.

It should be noted that the VCO 42 does not generate a signal having constant frequency output as does the VCO 16. Instead, a phase detector 52 compares the reference signal from the crystal oscillator 26 with a color burst signal from a detector 54. The color burst signal is derived from the IF video signal spectrum; and since the IF video signal spectrum will often contain time base errors produced by the recorder, the frequency spacing between the picture carrier and the color subcarrier will be incorrect and varying with time depending upon the particular time base errors present. For example, in a standard transmission the picture carrier and the color subcarrier should be spaced apart by the color subcarrier freqency of 3.58 MHz. If the recorder suffers a one percent decrease in speed, the picture carrier frequency will be reduced from 0.83 MHz to about 0.82 MHz, while the color subcarrier will be reduced from 4.41 MHz to about 4.37 MHz. The frequency spacing between the picture carrier and the color subcarrier is now approximately 3.55 MHz, instead of 3.58 MHz.

The phase of the color burst signal will vary according to the frequency spacing between the picture carrier and color subcarrier. Therefore, by comparing the reproduced color burst signal with the reference signal from the crystal oscillator 26, the phase detector 52 generates a control signal indicative of the spacing between the picture carrier and the color subcarrier. This control signal is applied to the VCO 42 to vary the heterodyning frequency applied to the mixer 40. The result is that the color subcarrier is made to fall exactly 3.58 MHz away from the picture carrier even when the frequency spacing between them is not exactly correct due to time base errors in the recorder.

The video recording and reproducing system described above assumes a 5.5 MHz bandwidth recording capability. In the event that the recorder possesses a bandwidth capability less than 5.5 MHz, the present invention provides a video recording and reproducing system requiring less bandwidth capability. In this sytem, the luminance information and the chrominance information are so recorded in separate tracks, so as to assure, upon playback, the proper frequency spacing between the picture carrier and the color subcarrier. To this end, no time base correction circuits are employed; instead, time base correction is "built-in" to the video recording and reproducing system.

Figure 7:
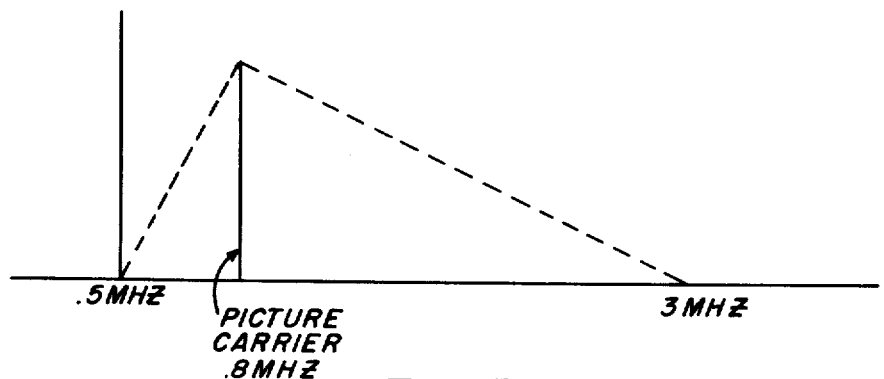
FIGS. 7 and 8 show the luminance portion and the chrominance and sound portions, respectively, of a video signal as recorded according to the embodiment of the invention shown in FIGS. 5 and 6.
Figure 5:
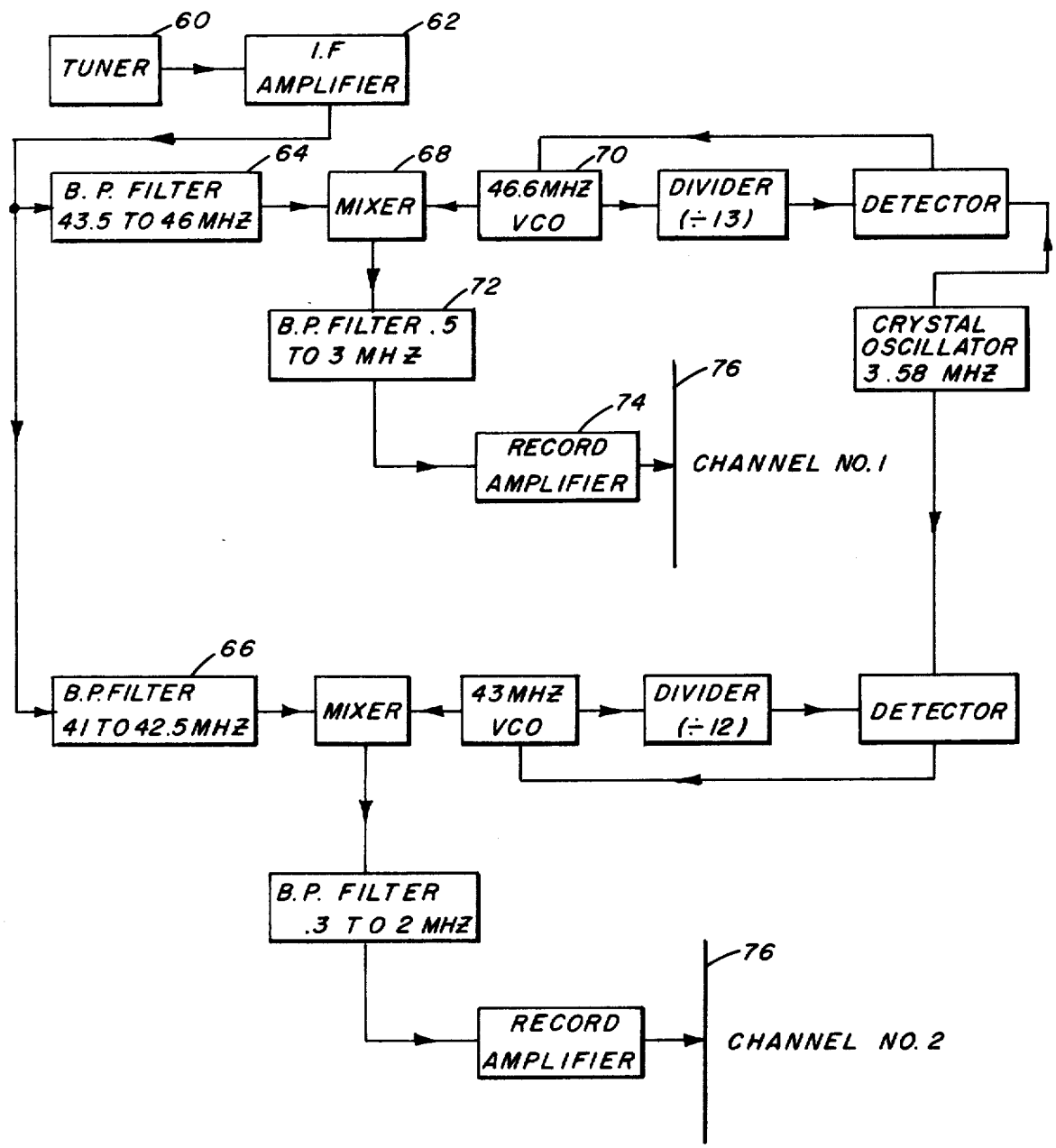
FIGS. 5 and 6 show the record configuration and the playback configuration, respectively, of a video signal recording and reproducing apparatus in accordance with a presently preferred embodiment of the present invention.

The two-track, or two-channel, video recording and reproducing system will now be described with reference to FIGS. 5 and 6 which show the recording and playback configurations, respectively. Consider first the recording configuration of FIG. 5: A tuner 60 selects and down-converts an RF video signal spectrum to an IF video signal spectrum (see FIG. 3). After amplification by an IF amplifier 62, the luminance portion of the IF video signal spectrum is separated from the chrominance and sound portion by a pair of bandpass filters 64 and 66. The bandpass filter 64 passes the luminance signal to a mixer 68 wherein it is down-converted to a recordable frequency range by heterodyning the luminance signals with a 46.6 MHz signal generated by a VCO 70. The VCO 70 operates similarly to the VCO 16 shown in FIG. 2 to generate an heterodyning signal having a constant frequency of 46.6 MHz. After down-conversion by the mixer 68, the luminance portion of the video signal spectrum is as shown in FIG. 7. A bandpass filter 72 is provided to reject unwanted frequencies. After passing through the bandpass filter 72 and a record amplifier 74, the luminance signals are recorded on a first track of a record medium 76.

Figure 8:
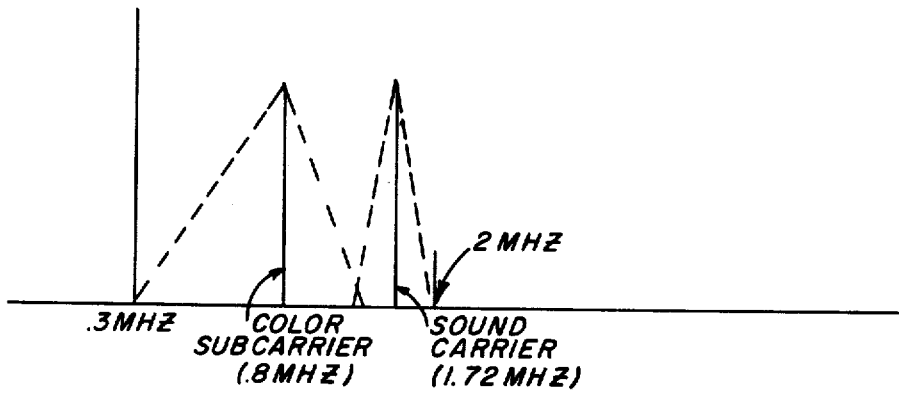

The chrominance and sound portions of the RF video signal spectrum are treated similarly and, after down-conversion to the form shown in FIG. 8 by a process similar to the down-conversion of the luminance portion of the video signal spectrum, the chrominance and sound signals are recorded on a second track of a record medium 76. There is one important difference between the down-conversion of the luminance signals and the down-conversion of the chrominance signals: The IF luminance signals are down-converted by mixing them with a 46.6 MHz heterodyning signal. The IF chrominance (and sound) signals are down-converted by mixing them with a 43 MHz heterodyning signal. One result of such a down-conversion is that the luminance signals occupy a bandwidth from 0.5 to 3 MHz (FIG. 7) and the chrominance and sound signals occupy bandwidth from 0.3 to 2 MHz (FIG. 8); and both bandwidths occupy frequency ranges which are readily recorded in separate tracks of a recording medium.

By down-converting the luminance signals, and the chrominance signals, by certain precise amounts, the luminance carrier and the color subcarrier are both recorded at approximately the same frequency, see FIGS. 7 and 8. Thus, time base errors during playback of the recorder will affect the luminance carrier and color subcarrier by the same amounts, whereby when the luminance and chrominance signals are up-converted and recombined to form the original RF video signal spectrum (a process described more fully in connection with FIG. 6), the frequency spacing between the luminance carrier and the color subcarrier will automatically be maintained at 3.58 MHz.

Figure 6:
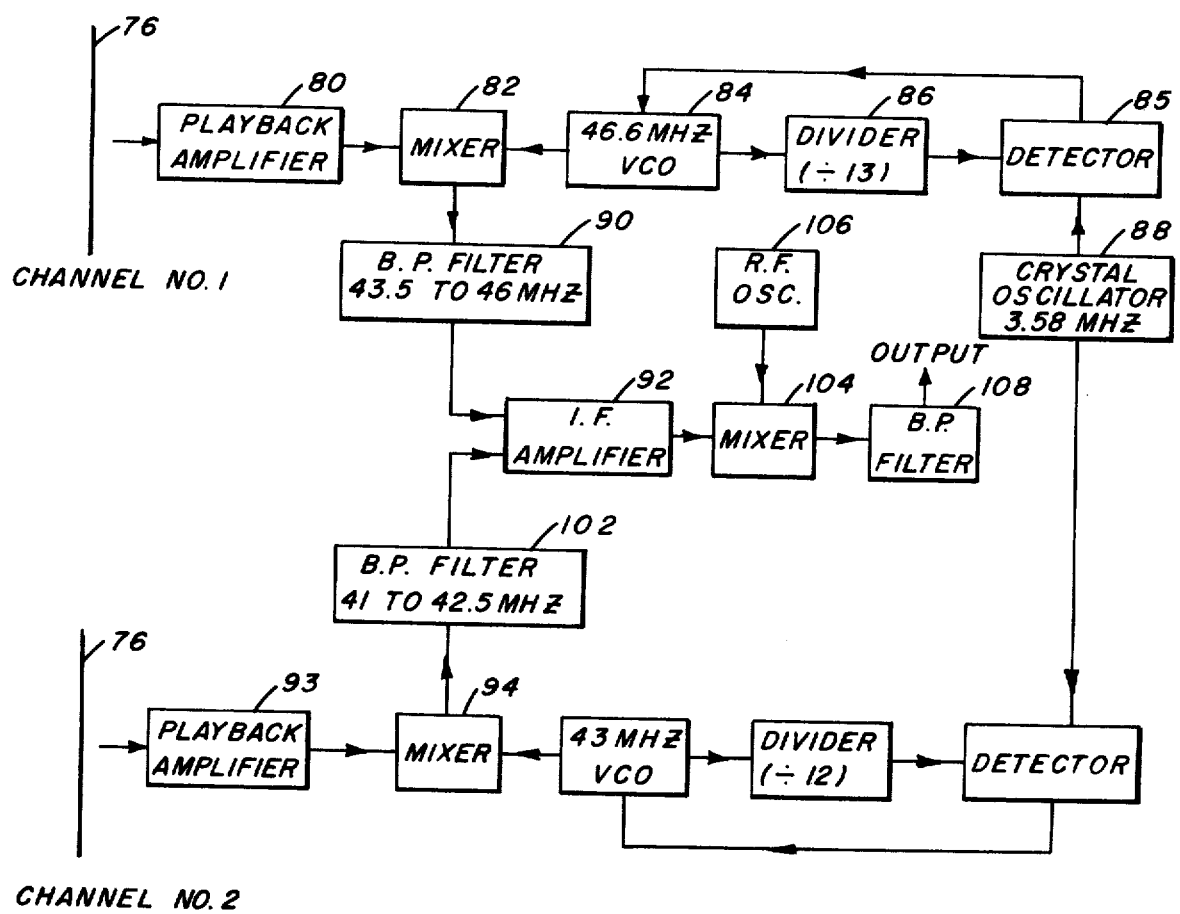

To appreciate more fully time base correction according to the invention, consider the playback configuration of FIG. 6: The luminance signals recorded in the first track of the record medium 76, after being amplified by a playback amplifer 80, are applied to a mixer 82. In the mixer 82, the luminance signals are heterodyned with a 46.6 MHz heterodyning signal generated by a VCO 84. The frequency of the 46.6 MHz heterodyning signal generated by the VCO 84 is controlled by a phase detector 85 wherein the heterodyning signal, after division by 13 in a divider 86, is compared with a 3.58 MHz reference signal produced by a crystal oscillator 88. The up-converted luminance signals pass through a bandpass filter 90 and to an IF amplifier 92.

The chrominance and sound signals are played back from the second track of the record medium 76 and, after amplification by a playback amplifier 93, are applied to a mixer 94. In a manner similar to the luminance signals, the chrominance and sound signals are up-converted in the mixer 94, the only difference being that the heterodyning frequency is 43 MHz (42.95454 MHz) instead of 46.6 MHz (46.534085 MHz). After passing through a bandpass filter 102, the up-converted chrominance signals are recombined with the luminance signals in the IF amplifier 92 to form the IF video signal spectrum shown in FIG. 3. This composite IF video signal spectrum is mixed in a mixer 104 with an RF heterodyning signal from an oscillator 106. The resulting signal is the RF video signal spectrum shown in FIG. 1 which, after passing through a bandpass filter 108, is supplied to a color television receiver for reproduction.

As stated previously, since the luminance carrier and the color subcarrier are recorded at approximately the same frequency, time base variations during playback affect both carriers identically. If the luminance carrier is shifted by a given frequency deviation, then so, too, is the color subcarrier. The heterodyning processes used in up-converting the carriers preserve these frequency deviations, thereby resulting in a fixed frequency spacing between the picture carrier and the color subcarrier. The embodiment of the invention described in connection with FIG. 2, while providing preferential dropout compensation, required a burst system (i.e., the detector 54, the phase detector 52, and the VCO 42) to correct for time base variations. Aside from providing improved dropout compensation since both the chrominance and sound signals are recorded at relatively low frequencies, the invention, as in FIGS. 5 and 6, requires no color burst or pilot system to correct for errors in the frequency spacing of the picture carrier and color subcarrier caused by the time base errors in the recorder.

The invention has been described in detail with particular reference to preferred embodiments thereof, but it will be understood that variations and modifications can be effected within the spirit and scope of the invention.

What is claimed is:

1. Apparatus for processing a carrier-supported television signal for recording on a record medium, the carrier-supported televison signal comprised of video signal information residing on a video carrier and audio signal information residing on an audio carrier, the audio carrier being situated at a higher frequency than the video carrier, said apparatus comprising:
   a. means for receiving the carrier-supported television signal having a format such that the audio carrier is at a higher frequency than the video carrier;
   b. an even-numbered plurality of mixers for successively frequency converting the carrier-supported television signal so that the frequency of the video carrier after mixing remains, frequency-wise, below the frequency of the audio carrier; and
   c. means for receiving the successively frequency converted television signal and for recording the successively frequency converted televison signal on a record medium.

2. Apparatus for processing a carrier-supported television signal for recording on a record medium, the carrier-supported television signal comprised of video signal information residing on a video carrier and audio signal information residing on an audio carrier, the audio carrier being situated at a lower frequency than the video carrier, said apparatus comprising:
   a. means for receiving the carrier-supported television signal having a format such that the audio carrier is at a lower frequency than the video carrier;
   b. an odd number of mixers for successively frequency converting the carrier-supported television signal so that the frequency of the video carrier after mixing is, frequencywise, below the frequency of the audio carrier; and
   c. means for receiving the successively frequency converted television signal and for recording the successively frequency converted televison signal on a record medium.

3. Apparatus for reproducing from a record medium a recorded carrier-supported televison signal, the carrier-supported televison signal comprised of luminance signal information residing on a video carrier and chrominance signal information residing on a color subcarrier, said apparatus comprising:
   a. means for reproducing from the record medium the recorded carrier-supported television signal;
   b. means for detecting time base variations in the reproduced carrier-supported television signal;
   c. means for separating from the reproduced carrier-supported television signal the luminance signal information residing on the video carrier from the chrominance signal information residing on the color subcarrier;
   d. means for mixing the luminance signal information residing on the video carrier with a luminance heterodyning signal of substantially constant frequency to frequency convert the video carrier and luminance signal information residing thereon;
   e. means, cooperating with said time base variation detecting means, for mixing the chrominance signal information residing on the color subcarrier with a chrominance heterodyning signal of varying frequency, said chrominance heterodyning signal so varying in frequency according to time base variations in the reproduced carrier-supported television signal that a frequency converted color subcarrier is produced having a fixed frequency spacing from the frequency converted video carrier; and
   f. means for combining the frequency converted luminance signal information on the video carrier with the frequency converted chrominance signal information on the color subcarrier to obtain a reproduced video signal wherein the frequency spacing between the video carrier and color subcarrier is constant regardless of time base variations.

4. Apparatus as claimed in claim 3 wherein said means for generating the chrominance heterodyning signal includes:
   g. means for detecting the frequency of the color burst signal in the chrominance signal information residing on the color subcarrier;
   h. means for generating a fixed frequency reference signal having a frequency equal to the nominal frequency of the color burst signal;
   i. means for comparing the actual frequency of the color burst signal as detected by said color burst detecting means with the frequency of the fixed frequency reference signal generated by said generating means and for producing a compensating signal indicative thereof; and
   j. a variable oscillator for producing a signal variable in frequency in response to said compensating signal, the signal produced by said variable oscillator being the chrominance heterodyning signal.

5. Apparatus for recording a carrier-supported television signal on a record medium, the carrier-supported television signal comprised of luminance signal information residing on a video carrier and chrominance signal information residing on a color subcarrier, said apparatus comprising:
   a. means for receiving the carrier-supported television signal and for separating the luminance signal information residing on the video carrier from the chrominance signal information residing on the color subcarrier;
   b. means for frequency converting the luminance signal information residing on the video carrier to a frequency range compatible with the record medium;
   c. means for so frequency converting the chrominance signal information residing on the color subcarrier that after frequency conversion the color subcarrier is of substantially the same frequency as the frequency converted video carrier; and
   d. means for recording the video carrier with luminance signal information residing thereon and the color subcarrier with chrominance signal information residing thereon on separate tracks of the record medium, whereby time base variations introduced in the recording process alters the frequency of the video carrier and the color subcarrier by the same amounts, and upon reproduction and reconstruction of the carrier-supported television signal, the frequency spacing between the video carrier and color subcarrier remains constant regardless of time base variations.

* * * * *